United States Patent
Sato et al.

(10) Patent No.: US 8,951,689 B2
(45) Date of Patent: Feb. 10, 2015

(54) FUEL CELL SYSTEM INCLUDING COOLANT ADDITIVE AND ION EXCHANGE RESIN AND FUEL-CELL VEHICLE

(75) Inventors: Katsuhiko Sato, Hamamatsu (JP); Mikio Yasukawa, Hamamatsu (JP); Akihiro Sagasaki, Gifu (JP); Tokio Wada, Gifu (JP); Yoshito Kato, Yokohama (JP)

(73) Assignees: Suzuki Motor Corporation (JP); Showa Water Industries Co., Ltd. (JP)

( * ) Notice: Subject to any disclaimer, the term of this patent is extended or adjusted under 35 U.S.C. 154(b) by 343 days.

(21) Appl. No.: 13/228,830

(22) Filed: Sep. 9, 2011

(65) Prior Publication Data

US 2012/0064426 A1 Mar. 15, 2012

(30) Foreign Application Priority Data

Sep. 14, 2010 (JP) ................... 2010-205743

(51) Int. Cl.
   *H01M 8/02* (2006.01)
   *H01M 8/04* (2006.01)
   *B60K 1/04* (2006.01)
   *B60L 11/18* (2006.01)

(52) U.S. Cl.
   CPC ......... *B60L 11/1896* (2013.01); *B60L 11/1803* (2013.01); *B60L 11/1877* (2013.01); *B60L 11/1887* (2013.01); *B60L 11/1892* (2013.01); *H01M 8/04029* (2013.01); *H01M 8/04044* (2013.01); *B60L 2200/12* (2013.01); *Y02T 10/7011* (2013.01); *Y02T 10/705* (2013.01); *Y02T 90/34* (2013.01); *H01M 8/04067* (2013.01); *Y02E 60/50* (2013.01)

USPC .......... 429/434; 429/535; 429/433; 180/65.21

(58) Field of Classification Search
   USPC ............ 429/434, 435, 438, 437, 465; 252/71, 252/75
   See application file for complete search history.

(56) References Cited

U.S. PATENT DOCUMENTS

| 7,138,199 | B2 | 11/2006 | Mohapatra | |
| 7,344,655 | B1* | 3/2008 | Nishii et al. | 252/75 |
| 7,393,464 | B2 | 7/2008 | Wenderoth et al. | |
| 2004/0086757 | A1* | 5/2004 | Mohapatra | 429/26 |
| 2004/0224201 | A1* | 11/2004 | St-Pierre et al. | 429/26 |

(Continued)

FOREIGN PATENT DOCUMENTS

| CN | 1537153 A | 10/2004 |
| JP | 2000-208157 | 7/2000 |

(Continued)

OTHER PUBLICATIONS

Machine Translation of: JP 2005/129384A, Matsuzaki, May 19, 2005.*

(Continued)

*Primary Examiner* — Kenneth Douyette
(74) *Attorney, Agent, or Firm* — Myers Bigel Sibley & Sajovec, P.A.

(57) ABSTRACT

A fuel cell system includes fuel cells, a circulation channel of a coolant to cool the fuel cells, and an ion exchange resin provided on the circulation channel to maintain electrical conductivity of the coolant. The coolant contains an additive. The ion exchange resin is prepared so that adsorption of the additive on the ion exchange resin is in a saturated state. A fuel-cell vehicle includes the fuel cell system.

5 Claims, 4 Drawing Sheets

(56) References Cited

U.S. PATENT DOCUMENTS

| | | | |
|---|---|---|---|
| 2005/0109979 A1 | 5/2005 | Egawa et al. | |
| 2006/0033074 A1* | 2/2006 | Wenderoth et al. | 252/71 |
| 2006/0063050 A1* | 3/2006 | Yang et al. | 429/26 |
| 2006/0141301 A1* | 6/2006 | Mohapatra | 429/13 |
| 2006/0269807 A1* | 11/2006 | Fujita et al. | 429/26 |
| 2007/0075120 A1* | 4/2007 | Yang et al. | 228/101 |
| 2010/0196773 A1* | 8/2010 | Yang et al. | 429/435 |

FOREIGN PATENT DOCUMENTS

| | | | | |
|---|---|---|---|---|
| JP | 2001-164244 | | 6/2001 | |
| JP | 2002-172391 | | 6/2002 | |
| JP | 2004-119215 | | 4/2004 | |
| JP | 2004-192959 | | 7/2004 | |
| JP | 2004-281106 | | 10/2004 | |
| JP | 2004-296375 | | 10/2004 | |
| JP | 2005129384 A * | 5/2005 | | H01M 8/04 |
| JP | 2006-331808 A | 12/2006 | | |
| JP | 2007-299574 | 11/2007 | | |
| WO | WO-01/023495 A1 * | 4/2001 | | H01M 8/02 |
| WO | WO 02/055630 A1 | 7/2002 | | |
| WO | WO 02/055759 A2 | 7/2002 | | |
| WO | WO 03/094271 A1 | 11/2003 | | |

OTHER PUBLICATIONS

Mueller et al. "Leaching of Ions from Fuel Cell Vehicle Cooling System and Their Removal to Maintain Low Conductivity", pp. 135-138 (2003).

First Office Action corresponding to Chinese Application No. 201110272697.4 issued on Nov. 5, 2013.

Office Action corresponding to Japanese Application No. 2010-205743 issued on May 8, 2014.

* cited by examiner

FUEL CELL SYSTEM INCLUDING COOLANT ADDITIVE AND ION EXCHANGE RESIN AND FUEL-CELL VEHICLE

CROSS-RELATED APPLICATIONS

This application claims priority from Japanese Patent Application No. 2010-205743; filed Sep. 14, 2010, the disclosure of which is incorporated herein by reference in its entirety.

BACKGROUND OF THE INVENTION

The present invention relates to a fuel cell system and to a fuel-cell vehicle.

In a fuel-cell vehicle, the temperature of fuel cells rises due to an exothermic reaction of the fuel cells and thus, while the fuel cells are cooled by a coolant, a radiator installed in a cooling system radiates heat of the coolant to maintain the operating temperature of the fuel cells at an optimum value (for example, 80° C.).

The coolant of fuel cells flows through a fuel-cell stack and there is a danger of a short circuit of cells or a leakage of current if electrical conductivity of the coolant is high. Thus, ion exchanged water (whose electrical conductivity is 1 mS/m or less) or low-conductive antifreeze (whose electrical conductivity is, for example, 10 mS/m or less) is used as the coolant (JP 2000-208157 A, JP 2001-164244 A).

A fuel-cell vehicle is supposed to be used in an environment in which the temperature falls to zero or below and thus, the use of ion exchanged water, which may be frozen, is not preferable. Therefore, glycols often used as a freezing-point depressant of an antifreeze for vehicle are preferably used as a coolant of fuel cells. However, glycols are known to generate corrosive substances such as organic acids due to heat degradation and to corrode metal components. Thus, when glycols are used as a coolant, an inhibitor such as an anticorrosion agent and an antioxidant is typically added to the coolant (JP 2001-164244 A, WO 03/094271 A).

The coolant poses a problem that electrical conductivity of the coolant is high because of ionization of products of such organic acids or the like caused by heat degradation or elution of ions from component materials (such as rubber and metal) in the cooling system. Thus, electrical conductivity of the coolant is maintained low by installing an ion exchange resin in the cooling system of fuel cells to remove ions (JP 2002-172391 A, JP 2004-192959 A). A mixed bed ion exchange resin in which both a cation exchange resin and an anion exchange resin are mixed is used as the ion exchange resin (JP 2007-299574 A).

SUMMARY OF THE INVENTION

It is desirable to install an ion exchange resin in a cooling system and to add a non-conductive or low-conductive inhibitor to a coolant to maintain electrical conductivity of the coolant low and also to prevent corrosion of the cooling system even if the coolant is cyclically used. However, it has turned out that the theoretically expected maintenance of electrical conductivity and anticorrosion performance are not achieved at all if a coolant to which a low-conductive inhibitor is added and an ion exchange resin are used therewith.

According to the findings of the present inventors, among additives such as an inhibitor added to the coolant, additives that are ionized in the coolant are adsorbed by the ion exchange resin installed in the cooling system. Therefore, even if such additives are added to the coolant at a given concentration, the additives cannot exhibit sufficient effects thereof.

In view of the above problem, an object of the present invention is to provide a fuel cell system and a fuel-cell vehicle in which an additive added to a coolant can exhibit sufficient effects thereof even if an ion exchange resin is installed in a cooling system.

To achieve the above object, an aspect of the present invention is a fuel cell system including: fuel cells; a circulation channel of a coolant to cool the fuel cells; and an ion exchange resin provided on the circulation channel to maintain electrical conductivity of the coolant, wherein the coolant contains an additive, and the ion exchange resin is prepared so that adsorption of the additive on the ion exchange resin is in a saturated state.

The ion exchange resin may be prepared by making a solution containing the additive pass through the ion exchange resin or soaking the ion exchange resin in the additive containing solution.

Another aspect of the present invention is a fuel-cell vehicle including the above fuel cell system. The fuel-cell vehicle herein includes two-wheel and four-wheel vehicles.

By using an ion exchange resin prepared so that adsorption of an additive by the ion exchange resin is in a saturated state, even if a coolant containing such an additive is made to pass through the ion exchange resin, the additive is not adsorbed and removed and therefore, sufficient effects of the additive like anticorrosion performance and oxidation resistance performance can be exhibited. In addition, electrical conductivity of the coolant can be maintained low because ions of heat degradation products such as organic acids and eluted ions from cooling system components can be adsorbed.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
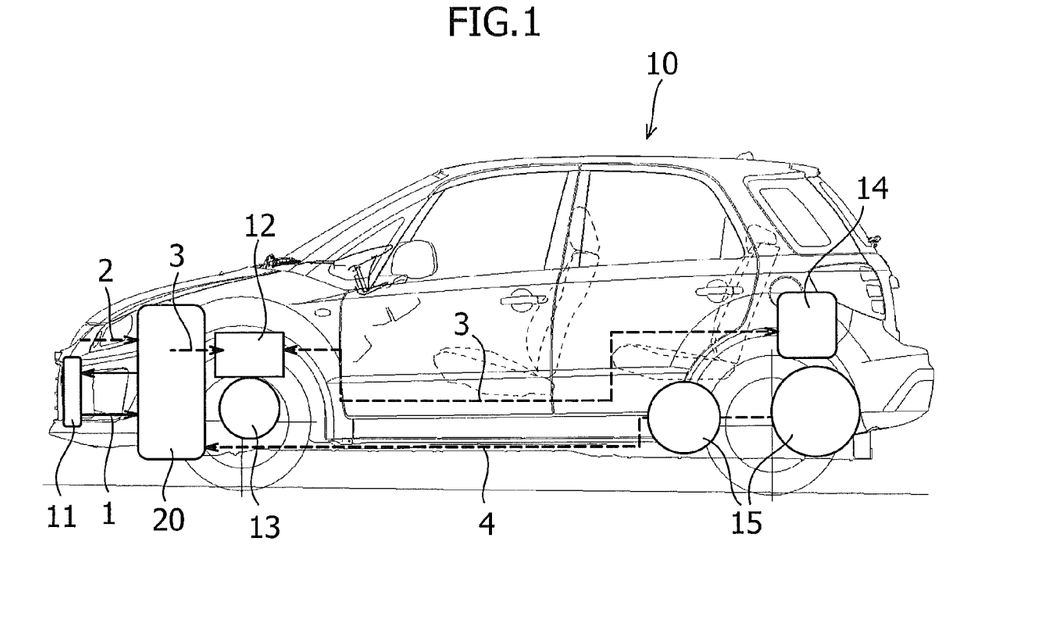
FIG. 1 is a schematic diagram showing an embodiment of a fuel-cell vehicle according to the present invention.

As shown in FIG. 1, a fuel-cell vehicle 10 includes a fuel-cell stack 20 and a radiator 11 that radiates heat of a coolant 1 cooling the fuel-cell stack. The fuel-cell vehicle 10 takes in air 2 from outside the vehicle to supply oxygen to the fuel-cell stack 20. The fuel-cell vehicle 10 also includes a hydrogen tank 15 to supply hydrogen 4 to the fuel-cell stack 20.

The fuel-cell vehicle 10 includes an inverter 12 and a drive motor 13 to use electric power 3 generated by the fuel-cell stack 20 as a driving force. Furthermore, the fuel-cell vehicle 10 includes a secondary battery 14 such as a battery and a capacitor in parallel with the fuel-cell stack 20 with respect to the inverter 12. The inverter 12 operates to charge the secondary battery 14 with surplus of the electric power 3 generated by the fuel-cell stack 20 or to compensate for shortage of the electric power 3 generated by the fuel-cell stack 20 from the secondary battery 14 when started or the like.

Figure 2:
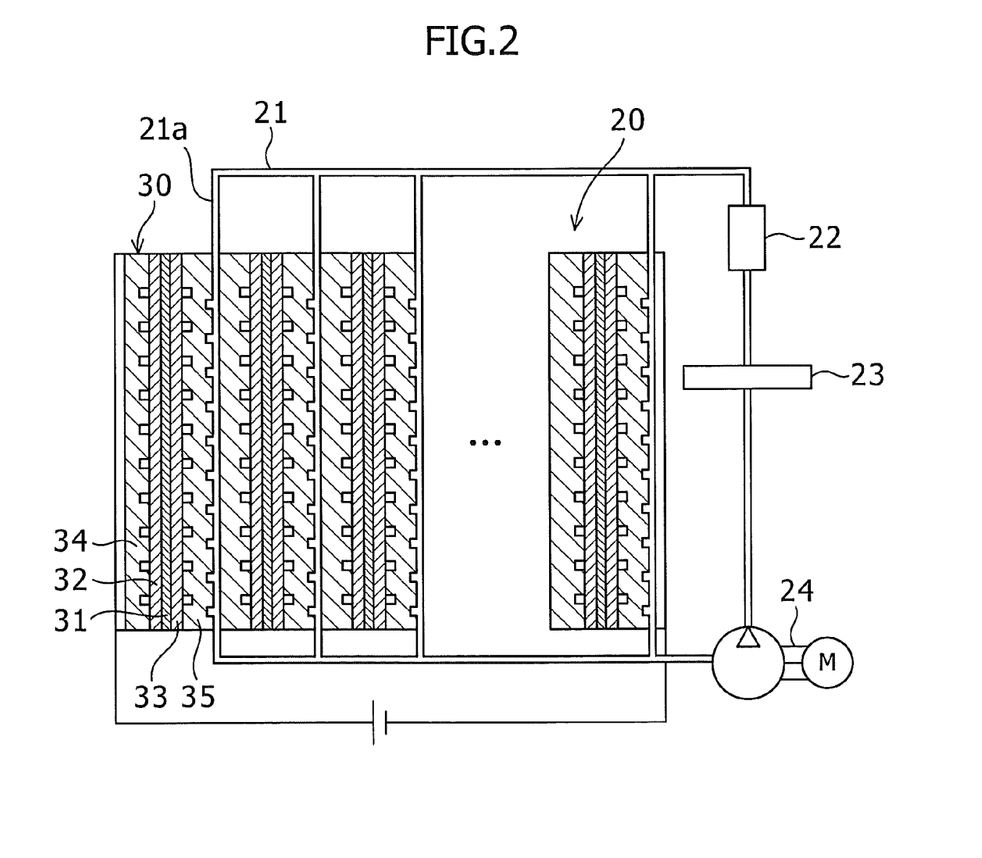
FIG. 2 is a schematic diagram showing an embodiment of a fuel cell system according to the present invention.

Next, a fuel cell system including the fuel-cell stack 20 and a cooling system thereof will be described in detail. As shown in FIG. 2, the fuel-cell stack 20 includes a plurality of single cells 30 stacked in series. The single cell 30 is formed, in a solid polymer fuel cell for example, by stacking an anode-side gas diffusion layer 32 and a cathode-side gas diffusion layer 33 on respective sides of a membrane electrode assembly 31 and stacking an anode-side separator 34 and a cathode-side separator 35 further on outer surfaces thereof, respectively. The single cell 30 has a flat shape as a whole.

By supplying hydrogen to the anode-side gas diffusion layer 32 and supplying the air to the cathode-side gas diffusion layer 33, an electrochemical reaction is caused in the membrane electrode assembly 31 to generate electric energy. Heat is generated in each of the single cells 30 by the generation. Thus, a coolant channel 21 through which a coolant flows is arranged in the fuel-cell stack 20 to remove the heat. The coolant channel 21 forms a circuit to use the coolant repeatedly. The coolant channel 21 is provided with an ion exchange resin 22 to maintain electrical conductivity of the coolant even through cyclic use, a heat exchanger 23 to cool the heated coolant, and a pump 24 to circulate the coolant arranged therein. The heat exchanger 23 may be, as shown in FIG. 1, the radiator 11. To efficiently cool each of the single cells 30, the coolant channel 21 branches into a plurality of channels 21a whereby the coolant flows between the single cells 30.

A material having low electrical conductivity and non-freezing properties is desirable as a base material, which is a main component of the coolant, and more specifically one of water, alcohols, glycols, and glycol ethers or a mixture of two or more of the above materials can be used.

Exemplary alcohols can include methanol, ethanol, propanol, butanol, pentanol, hexanol, heptanol, and octanol or a mixture of two or more of the above alcohols.

Exemplary glycols can include ethylene glycol, diethylene glycol, triethylene glycol, propylene glycol, 1,3-propanediol, 1,3-butanediol, 1,5-pentanediol, and hexylene glycol or a mixture of two or more of the above glycols.

Exemplary glycol ethers can include ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether or a mixture of two or more of the above ethers.

Among these, glycols often used as a freezing-point depressant of a coolant for vehicle, particularly ethylene glycol or propylene glycol is preferably used as a base material of the coolant.

A coolant in the present invention contains additives in addition to the above base material, and additives intended for the present invention are additives ionized after being added to the coolant. Effects of such additives are not specifically limited, but effects shown below are preferable.

Examples of the additive can include, first of all, an inhibitor such as an anticorrosive agent and an antioxidant. A coolant is thermally degraded or oxidized due to repeated use thereof and generates corrosive substances. The inhibitor can suppress corrosion of metal due to the corrosive substances and generation of corrosive substances. Specific examples of the inhibitor described above can include azoles, aliphatic carboxylic acid, aromatic carboxylic acid, phosphoric acid, silicic acid, nitric acid, nitrous acid, boric acid, molybdic acid and alkali metal salt, ammonium salt, amine salt, and amines thereof.

Exemplary azoles include triazoles, diazoles, and thiazoles. Exemplary triazoles include benzotriazole, methyl benzotriazole, cyclobenzotriazole, and 4-phenyl-1,2,3-triazole. Exemplary diazoles include imidazoline, imidazole, mercaptoimidazoline, mercaptoimidazole, benzimidazoline, and methylimidazole. Exemplary thiazoles include mercaptobenzothiazole, benzothiazole, and alkali metal salts thereof. The structure and ionization of 2-mercaptobenzothiazole are shown below.

Ionization of the compound is caused by ionization of SH in the compound. Ions to be adsorbed and removed by an ion exchange resin are typically organic acid ions (carboxyl ions), which are corrosive products, and metallic ions, which are elution ions from cooling system components. Thus, ions to be adsorbed and removed by the ion exchange resin, such as organic acid ions and metallic ions, can all be adsorbed and removed even if adsorption of an additive in which SH or the like is ionized is saturated.

Exemplary aliphatic carboxylic acids include aliphatic monobasic acid such as pentanoic acid, hexanoic acid, heptanoic acid, octanoic acid, 2-ethyl hexanoic acid, nonanoic acid, decanoic acid, undecanoic acid, dodecanoic acid, oleic acid, linoleic acid, linolenic acid, and stearic acid, and aliphatic dibasic acid such as maleic acid, fumaric acid, itaconic acid, citraconic acid, mesaconic acid, oxalic acid, malonic acid, succinic acid, glutaric acid, adipic acid, piperic acid, suberic acid, azelaic acid, sebacic acid, undecanedioic acid, dodecanedioic acid, brassylic acid, and taptic acid.

Exemplary aromatic carboxylic acids include benzoic acids such as benzoic acid, nitrobenzoic acid, and hydroxybenzoic acid, alkylbenzoic acid such as p-toluic acid, p-ethyl benzoic acid, p-propyl benzoic acid, p-isopropyl benzoic acid, and p-tert butyl benzoic acid, alkoxy benzoic acid represented by a formula $RO-C_6H_4-COOH$ (R is an alkyl group of $C_1$ to $C_5$), cinnamic acid represented by a formula $R-C_6H_4-CH=COOH$ (R is an alkyl group or alkoxy group of $C_1$ to $C_5$), alkyl cinnamic acid, and alkoxy cinnamic acid.

Exemplary phosphoric acids include orthophosphoric acid, pyrophosphoric acid, trimetaphosphoric acid, and tetraphosphoric acid.

As an additive, a surface active agent can be added to improve dispersability. Examples of the surface active agents include an anionic surface active agent, cationic surface active agent, and nonionic surface active agent. Examples of the anionic surface active agent include carboxylate, sulfonate, sulfate, and phosphate. Examples of the cationic surface active agent include aliphatic amine and pyridinium salt. Examples of the nonionic surface active agent include polyoxyethylene alkylphenol ether, polyoxyethylene alkyl ether, and polyoxyethylene fatty ester.

Furthermore, as an additive, an antifoaming agent can be added to suppress generation of foam in the coolant. Examples of the antifoaming agent include a silicon based antifoaming agent.

The ion exchange resin 22 removes a broad range of ions such as organic acid ions of corrosive products and metallic ions, which are elution ions from cooling system components, and thus, it is preferable to use a mixed bed ion exchange resin in which both of a cation exchange resin and an anion exchange resin are mixed. Alternatively, only the cation exchange resin or the anion exchange resin may be used.

The ion exchange resin 22 prepared so that adsorption of a predetermined additive to be added to the coolant is in a saturated state is used so as to maintain the effects of the additive to be added to the coolant for a long period. The preparation of the ion exchange resin 22 can be done by making a solution containing the additive pass through the ion exchange resin 22.

Figure 3:
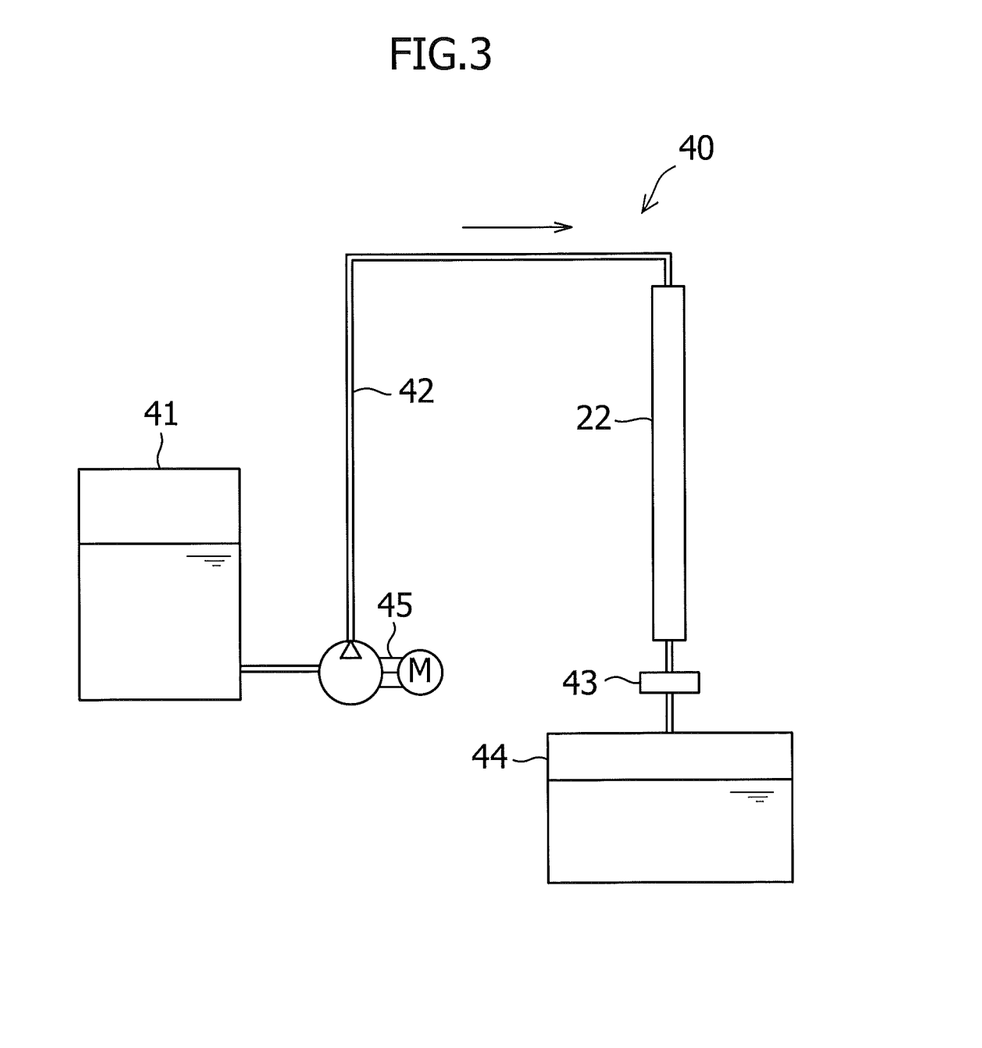
FIG. 3 is a schematic diagram showing an example of a preparation device of an ion exchange resin shown in FIG. 2.

More specifically, as shown in FIG. 3, a preparation device 40 of an ion exchange resin includes a supply tank 41 to supply a solution containing a predetermined additive, a solution channel 42 to make the additive solution pass through the ion exchange resin 22, and a recovery tank 44 to recover the additive solution after passing through the ion exchange resin. A flowmeter 43 to measure the flow rate of the additive solution per unit time and a pump 45 to send the additive solution from the supply tank 41 to the recovery tank are arranged on the solution channel 42. It is preferable to use materials from which ion elution is less likely such as borosilicate glass, olefin base resin, and fluororesin for all components that come into contact with the additive solution.

According to the preparation device, the ion exchange resin 22 to be prepared is mounted on the solution channel 42 and the pump 45 is started to make the additive solution pass through the ion exchange resin. Then, the solution is made to pass through the ion exchange resin until the predetermined additive is no longer adsorbed by the ion exchange resin, that is, the adsorption is saturated. By saturating the adsorption of only predetermined ions derived from the additive in this manner in a fuel cell system, the ion exchange resin 22 can not only maintain low electrical conductivity of the coolant by adsorbing organic acid ions generated as a result of heat degradation of the coolant and metallic ions, which are elution ions from cooling system components, but also achieve sufficient effects of the additive such as an inhibitor including anticorrosion performance and oxidation resistance performance because the additive contained in the coolant is not adsorbed.

Adverse effects of organic acid generation lead not only to a rise in electrical conductivity but also to lowering of pH (lowering to, for example, pH 3) of the coolant. Thus, aluminum used for cooling system components such as a radiator may be corroded (the passivity range of aluminum is pH 4 to 9 and corrosion may occur if there is no anticorrosive). Therefore, by adsorbing and removing organic acid ions with the ion exchange resin, an effect of anticorrosion can also be exhibited.

The solvent of an additive solution is not particularly limited as long as additives are ionized, and a base material of glycols, which are a main component of the coolant, may be used and ion exchanged water may also be used as the solvent. The concentration of additives in the additive solution is not particularly limited, but since adsorption by the ion exchange resin increases as the concentration is higher, the amount of additive solution that has passed can be reduced and the time for the additive solution to pass can also be reduced as the concentration is higher.

As the amount of additive solution passing through the ion exchange resin per unit time is larger, the time during which the additive solution passes until the saturated state is reached can be reduced. However, if the passing amount of additive solution pass per unit time is too great, a pressure loss also increases. It is thus preferable to set a space velocity SV, which is the flow rate of an additive solution per unit volume of the ion exchange resin, within a range of 10 to 50.

The preparation of the ion exchange resin is not limited to the above-described method of making an additive solution pass therethrough. For example, adsorption of only predetermined ions derived from additives can also be saturated by soaking the ion exchange resin in an additive solution.

EXAMPLES

Test of Adsorption of an Inhibitor by an Ion Exchange Resin

An example and a preliminary test example using an inhibitor as an additive will be described below. A test was performed to check whether a phenomenon in which an inhibitor in a coolant is adsorbed by the ion exchange resin whereby the inhibitor is reduced occurs. 2-mercaptobenzothiazole was used as an inhibitor and a coolant (50% v/v aqueous solution) whose initial electrical conductivity was 1.5 mS/m was made to pass through the ion exchange resin with a volume of 150 mL at the space velocity SV=10 at a temperature of 25° C. As a result, the electrical conductivity of the coolant after the coolant was made to pass through the ion exchanged resin dropped to 0.5 mS/m and the concentration of the inhibitor dropped even to about 10% of the initial concentration. Accordingly, adsorption of the inhibitor by the ion exchange resin was confirmed.

Heat Degradation Test of the Coolant after the Inhibitor being Reduced

A test was further performed to check whether the coolant in which the inhibitor is adsorbed by the ion exchange resin has lower oxidation resistance performance and anticorrosion performance. A heat degradation test of the coolant obtained in the above test was performed by keeping the coolant in a constant temperature bath at 90° C. for 2000 h. As a result, compared with an untreated coolant in which no additive solution was made to pass through the ion exchange resin, electrical conductivity dramatically increased as shown in Table 1.

TABLE 1

|  | Whether additive solution was made to pass through the ion exchange resin | |
|---|---|---|
|  | No | Yes |
| Initial electrical conductivity (mS/m) | 1.5 | 0.1 |
| Electrical conductivity after the test (mS/m) | 3.0 | 11.2 |

Figure 4:
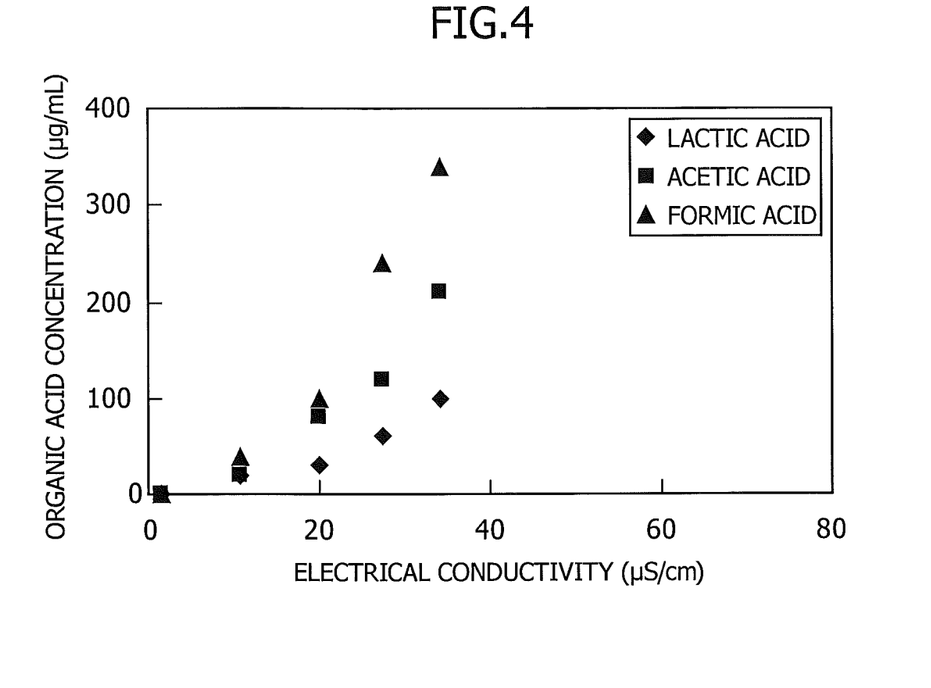
FIG. 4 is a graph showing a relationship between an organic acid concentration of a coolant and electrical conductivity.

Formic acid ions, acetic acid ions and lactic acid ions were detected in the coolant after the heat degradation test as a result of analyzing the coolant by ion chromatography. These organic acids are known as heat degradation products of a glycol based coolant and increases electrical conductivity of the coolant through ionization. The relationship between the concentration of ions of each organic acid in the coolant and the electrical conductivity of the coolant was determined and, correlation therebetween was confirmed for ions of each organic acid ion as shown in FIG. 4. Thus, as shown in Table 1, a significant decrease in oxidation resistance performance of the coolant in which the inhibitor decreased was confirmed due to generation of a large amount of organic acids caused by heat degradation.

Test of Creation of an Adsorption Isotherm

Figure 5:
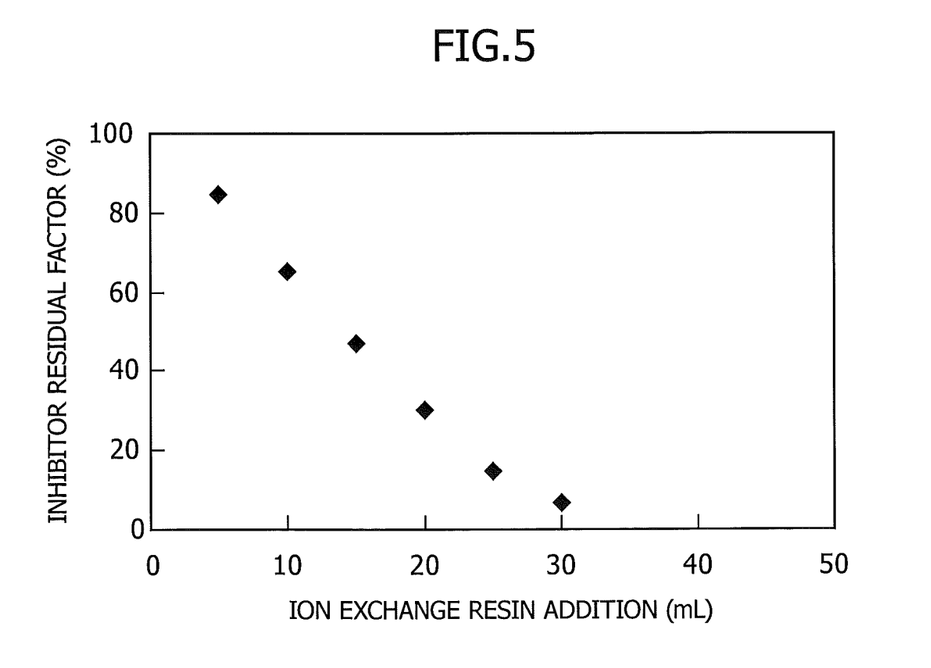
FIG. 5 is a graph showing a relationship between an ion exchange resin addition and an inhibitor residual factor.
Figure 6:
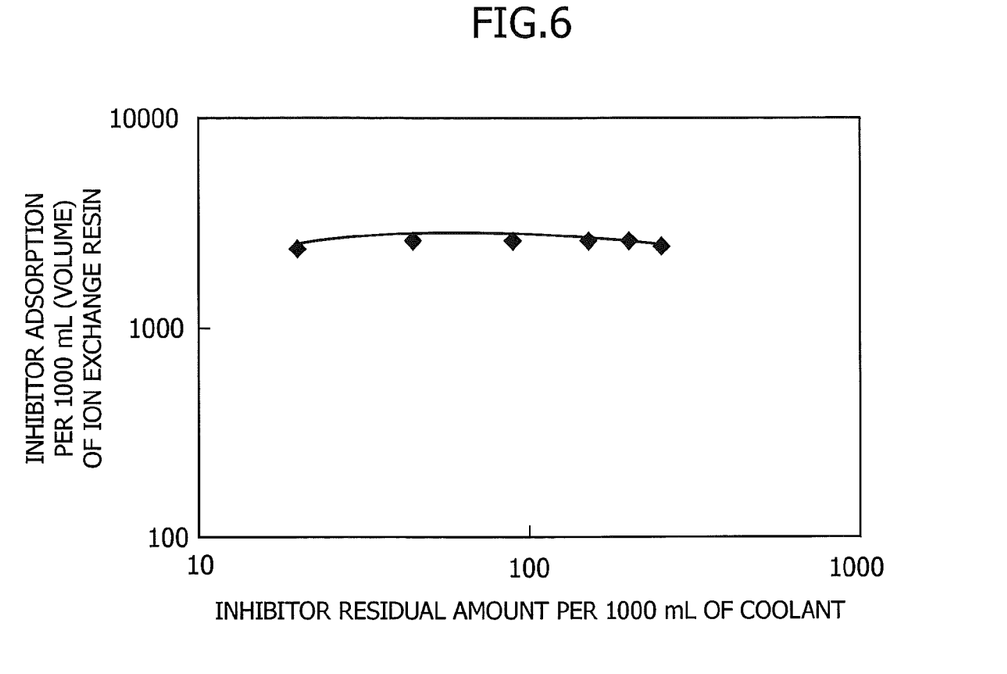
FIG. 6 is an adsorption isotherm showing a relationship between the inhibitor residual factor and an inhibitor adsorption.

Based on JIS (Japanese Industrial Standard) K 1474 "Activated carbon testing method", an ion exchange resin of 5 to 30 mL (volume) was added to a coolant of 250 mL and a shaking adsorption test was performed at 25° C. for 24 h to obtain an inhibitor residual factor in the coolant after the test. A result thereof is shown in FIG. 5. As shown in FIG. 5, the inhibitor residual factor in the coolant decreased as the addition of the ion exchange resin increased. Then, the inhibitor adsorption per unit volume (1000 mL) of the ion exchange resin was determined from the result of the addition of the ion exchange resin and the inhibitor residual factor to create an adsorption isotherm (FIG. 6). The amount of inhibitor per 1000 mL of the coolant is 300 units. As shown in FIG. 6, it was confirmed that the inhibitor adsorption per unit volume of the ion exchange resin in a saturated equilibrium state was almost constant regardless of the addition of the ion exchange resin.

Preparation of the Ion Exchange Resin in a Saturated State

A mixed bed ion exchange resin in which cation exchange resin (C160 manufactured by PUROLITE) having a macro porous structure and an anion exchange resin (A500 manufactured by PUROLITE) having a macro porous structure were mixed in the ratio of 3:7 was used as the ion exchange resin. A column with an inner diameter of 18 mm made of borosilicate glass was filled with 40 mL of the ion exchange resin.

An inhibitor solution having a composition similar to that of the coolant was used as an inhibitor solution to pass through the ion exchange resin. That is, the inhibitor solution was an aqueous solution of a concentration of 50% v/v in which propylene glycol was used as a freezing-point depressant, which was a base material of the coolant. 2-mercaptobenzothiazole was used as an inhibitor.

When the inhibitor was added so that the concentration thereof became 1% v/v, electrical conductivity of the propylene glycol solution rose from 0.5 mS/m before the addition to 0.9 mS/m after the addition. Then, the inhibitor solution having initial electrical conductivity of 0.9 mS/m was made to pass through 40 mL of the ion exchange resin at SV=10 at 25° C. by using the preparation device shown in FIG. 3. Results thereof are shown in Table 2. As shown in Table 2, as the passing amount of the solution increased, such as to 400 mL and to 800 mL, the inhibitor residual factor of the recovered inhibitor solution increased and the inhibitor residual factor reached 100% when the passing amount of the solution was 2400 mL. That is, the ion exchange resin came to be in a saturated state of adsorption of the inhibitor (Example 1).

TABLE 2

| Passing amount of solution (mL) | Inhibitor residual factor (%) | Electrical conductivity (mS/m) |
|---|---|---|
| 0 | — | 0.9 |
| 100 | 1 | 0.1 |
| 400 | 75 | 0.1 |
| 800 | 93 | 0.1 |
| 2400 | 100 | 0.1 |
| 4500 | 100 | 0.1 |

Under the same conditions, the coolant solution having initial electrical conductivity of 0.9 mS/m was made to pass through 40 mL of the ion exchange resin at SV=10 at 25° C. Results thereof are shown in Table 3. As shown in Table 3, as the passing amount of the solution increased, such as to 1000 mL, to 1500 mL, and to 2000 mL, the inhibitor residual factor increased and the inhibitor residual factor reached 100% when the flow amount of solution was 2500 mL,

TABLE 3

| Passing amount of solution (mL) | Inhibitor residual factor (%) | Electrical conductivity (mS/m) |
|---|---|---|
| 0 | — | 0.9 |
| 500 | 40 | 0.1 |
| 1000 | 92 | 0.2 |
| 1500 | 95 | 0.2 |
| 2000 | 99 | 0.2 |
| 2500 | 100 | 0.2 |

Figure 7:
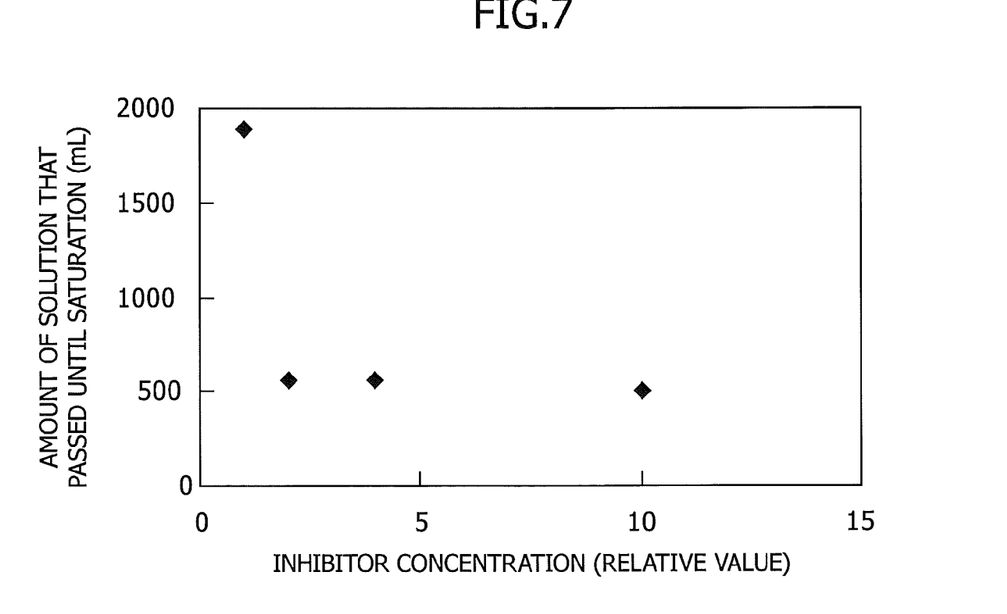
FIG. 7 is a graph showing a relationship between an inhibitor concentration of an additive solution and an amount of solution that has passed until saturation.

Ion exchange resins were prepared to be in a saturated state in the same manner as in Example 1 except that the inhibitor (azoles) was added so that the inhibitor concentrations of the inhibitor solutions were 2, 4 and 10% v/v (Examples 2 to 4) as shown in Table 4. Results thereof are shown in Tables 5 to 7. A graph showing the relationship between the inhibitor concentration and the amount of the solution that passed until saturation based on these results is shown in FIG. 7. As shown in FIG. 7, as the concentration of the inhibitor solution increases, the amount of inhibitor solution that passed until the ion exchange resin was saturated decreased, and it was confirmed that the trend thereof was strong up to a certain inhibitor concentration and beyond that, the trend became weaker.

TABLE 4

|  |  | Example 1 | Example 2 | Example 3 | Example 4 |
|---|---|---|---|---|---|
| Composition of inhibitor solution (%) | Propylene glycol | 50 | 50 | 50 | 50 |
|  | Ion exchanged water | Rest | Rest | Rest | Rest |
|  | Azoles | 1 | 2 | 4 | 10 |
| Electrical conductivity (mS/m) |  | 0.9 | 0.3 | 0.5 | 0.5 |

TABLE 5

| Passing amount of solution (mL) | Inhibitor residual factor (%) | Electrical conductivity (mS/m) |
|---|---|---|
| 0 | — | 0.3 |
| 430 | 30 | 0.1 |
| 460 | 85 | 0.2 |
| 560 | 98 | 0.2 |

TABLE 6

| Passing amount of solution (mL) | Inhibitor residual factor (%) | Electrical conductivity (mS/m) |
|---|---|---|
| 0 | — | 0.5 |
| 100 | 5 | 0.2 |
| 200 | 65 | 0.2 |
| 300 | 80 | 0.2 |
| 400 | 88 | 0.3 |
| 480 | 90 | 0.3 |
| 580 | 99 | 0.3 |

TABLE 7

| Passing amount of solution (mL) | Inhibitor residual factor (%) | Electrical conductivity (mS/m) |
|---|---|---|
| 0 | — | 0.5 |
| 100 | 28 | 0.4 |
| 200 | 91 | 0.4 |
| 300 | 96 | 0.5 |
| 400 | 97 | 0.5 |
| 450 | 95 | 0.5 |
| 500 | 100 | 0.5 |

Ion Exchange Capacity of the Ion Exchange Resin in a Saturated State

A test was performed to check the ion exchange capacity of the ion exchange resin when adsorption of the inhibitor reached a saturated state. 4 mg of potassium formate was added to the recovered inhibitor solution of 1 mS/m to obtain electrical conductivity of 0.3 mS/m. The solution was made to pass through 40 mL of the ion exchange resin in the saturated state at SV=10 at 25° C. Results thereof are shown in Table 8. As shown in Table 8, while the inhibitor was not adsorbed, the electrical conductivity decreased, which confirms that formic acid ions and potassium ions were adsorbed.

TABLE 8

| Passing amount of solution (mL) | Inhibitor residual factor (%) | Electrical conductivity (mS/m) |
|---|---|---|
| 0 | — | 0.3 |
| 100 | 100 | 0.1 |
| 500 | 100 | 0.1 |
| 1000 | 100 | 0.1 |

Similarly, 40 mg of potassium formate was added to the recovered inhibitor solution of 1 mS/m to obtain electrical conductivity of 7.0 mS/m. The solution was made to pass through 40 mL of the ion exchange resin in the saturated state at SV=10 at 25° C. Result thereof are shown in Table 9. As shown in Table 9, while the inhibitor was not adsorbed, the electrical conductivity decreased, which confirms that formic acid ions and potassium ions were adsorbed.

TABLE 9

| Passing amount of solution (mL) | Inhibitor residual factor (%) | Electrical conductivity (mS/m) |
|---|---|---|
| 0 | — | 7.0 |
| 30 | 100 | 0.1 |
| 60 | 100 | 0.1 |
| 90 | 100 | 0.1 |
| 120 | 100 | 0.1 |

Using an evaluation test of a rubber hose for a cooling system of fuel cells, a used coolant whose electrical conductivity has risen to 5.1 mS/m was made to pass through 40 mL of the ion exchange resin at SV=10 at 25° C. Results thereof are shown in Table 10. As a result of analyzing the used coolant by ion chromatography, formic acid ions, acetic acid ions, lactic acid ions, calcium ions, potassium ions, sodium ions, and zinc ions were detected. Among these ions, organic acid ions are considered to have eluted from heat degradation products of the coolant and metallic ions are considered to be eluted from cooling system components of fuel cells. As shown in Table 10, while the inhibitor was not adsorbed, the electrical conductivity decreased, which confirms that organic acid ions and metallic ions described above were adsorbed.

TABLE 10

| Passing amount of solution (mL) | Inhibitor residual factor (%) | Electrical conductivity (mS/m) |
|---|---|---|
| 0 | — | 5.1 |
| 30 | 100 | 0.2 |
| 60 | 100 | 0.1 |
| 90 | 100 | 0.1 |
| 120 | 100 | 0.1 |
| 150 | 100 | 0.1 |

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A fuel cell system comprising:
   fuel cells;
   a circulation channel of a coolant to cool the fuel cells, the coolant containing an inhibitor comprising mercaptobenzothiazole; and
   an ion exchange resin provided on the circulation channel for removing and adsorbing ions which are generated in the coolant to maintain electrical conductivity thereof, the ions being organic acid ions of corrosive products and metallic ions eluted from cooling system components, the ion exchange resin having been saturated with only the inhibitor prior to contact with the coolant even when the ion exchange resin adsorbs the organic acid ions and the metallic ions, the ion exchange resin maintains an inhibitor concentration of the coolant without releasing the inhibitor saturated in the ion exchange resin.

2. The fuel cell system according to claim 1, wherein saturation of the ion exchange resin is achieved by making a solution containing the inhibitor pass through the ion exchange resin.

3. The fuel cell system according to claim 1, wherein saturation of the ion exchange resin is achieved by soaking the ion exchange resin in a solution containing the inhibitor.

4. A fuel-cell vehicle comprising the fuel cell system according to claim 1.

5. A method for manufacturing a fuel cell system comprising fuel cells, a circulation channel of a coolant to cool the fuel cells, and an ion exchange resin provided on the circulation channel for removing and adsorbing ions which are generated in the coolant to maintain electrical conductivity thereof, the ions being organic acid ions of corrosive products and metallic ions eluted from cooling system components, the method comprising:

arranging a circulation channel of a coolant in fuel cells so that the coolant cools the fuel cells;

providing an inhibitor to be contained in the coolant, the inhibitor comprising mercaptobenzothiazole;

preparing an ion exchange resin by making a solution containing the inhibitor pass through the ion exchange resin or by soaking the ion exchange resin in a solution containing the inhibitor until the ion exchange resin adsorbs only the inhibitor in a saturated state, even when the ion exchange resin adsorbs the organic acid ions and the metallic ions, the ion exchange resin maintains an inhibitor concentration of the coolant without releasing the inhibitor saturated in the ion exchange resin; and arranging the resulting ion exchange resin in the circulation channel.

* * * * *